United States Patent
Weiss et al.

(10) Patent No.: US 6,288,634 B1
(45) Date of Patent: Sep. 11, 2001

(54) AUDIO SYSTEM FOR VEHICLES, IN PARTICULAR FOR MOTOR VEHICLES

(75) Inventors: Bernd Weiss, Gummersbach; Reinhard Lendholt, Wolfsburg; Detlev Beyer, Isenbüttel; Olaf Pawlitzki; Otto Schönemann, both of Wolfsburg, all of (DE)

(73) Assignees: Delphi Automotive Systems Deutschland GmbH, Wuppertal; Volkswagen AG, Wolfsburg, both of (DE)

( * ) Notice: Subject to any disclaimer, the term of this patent is extended or adjusted under 35 U.S.C. 154(b) by 0 days.

(21) Appl. No.: 09/029,728

(22) PCT Filed: Aug. 30, 1996

(86) PCT No.: PCT/EP96/03817

§ 371 Date: May 6, 1998

§ 102(e) Date: May 6, 1998

(87) PCT Pub. No.: WO97/09200

PCT Pub. Date: Mar. 13, 1997

(30) Foreign Application Priority Data

Sep. 1, 1995 (DE) .......................................... 295 14 059 U

(51) Int. Cl.[7] .................................................. B60R 25/10
(52) U.S. Cl. .................. 340/426; 340/568.1; 340/825.3; 455/346; 455/348
(58) Field of Search ................................ 340/426, 568.1, 340/542, 543, 572.3, 825.3, 825.31, 825.32; 455/346, 348

(56) References Cited

U.S. PATENT DOCUMENTS

| 4,683,462 | * | 7/1987 | Takeda et al. | 340/571 |
|---|---|---|---|---|
| 4,720,700 | * | 1/1988 | Seibold et al. | 340/568 |
| 4,743,894 | * | 5/1988 | Bochmann | 340/691 |
| 5,349,326 | * | 9/1994 | Yamada | 340/426 |
| 5,705,975 | * | 1/1998 | Serino et al. | 340/426 |

FOREIGN PATENT DOCUMENTS

| 37 23 931 | | 6/1988 | (DE) . |
|---|---|---|---|
| 0 556 468 | | 8/1993 | (EP) . |
| 0635408A1 | * | 7/1994 | (EP) . |
| 0 635 408 | | 1/1995 | (EP) . |
| WO 93/23833 | | 11/1993 | (WO) . |

* cited by examiner

Primary Examiner—Jeffery Hofsass
Assistant Examiner—Daniel Prevl
(74) Attorney, Agent, or Firm—Proskauer Rose LLP

(57) ABSTRACT

An audio system for vehicles, in particular for motor vehicles, comprises a device component (A) permanently fixed to the vehicle, and a mobile component (B) connected to the device component in a mechanically detachable way. The device component further comprises a control unit (1), and the mobile component further comprises a transponder for storing a numerical code. The function of the audio system is interrupted when the mobile component is removed from the device component, and resumed, following an authorization check, when the mobile component (B) is replaced. The authorization check is performed by the control unit which further comprises a comparator unit (2) for comparing the numerical code transmitted by the transponder (T) with a security code previously stored in the device component.

6 Claims, 1 Drawing Sheet

AUDIO SYSTEM FOR VEHICLES, IN PARTICULAR FOR MOTOR VEHICLES

BACKGROUND OF THE INVENTION

The invention concerns an audio system for vehicles, in particular for motor vehicles, comprising a device component permanently fixed to the vehicle and a mobile component connected to it in a mechanically detachable way, as well as a control unit arranged in the permanently fixed device component, by means of which the function of the audio system is interrupted when the mobile component is removed, and resumed, following an authorization check, when the mobile component is put back in its place, whereby for the authorization check the control device contains a comparator unit for comparing the numerical code stored in the mobile component with the security code stored in the stationary device component.

In order to protect audio systems, for example car radios, car telephones and similar devices designed for mobile use, it is known to connect the mobile component in an electrically and mechanically detachable way with the device component installed in the vehicle. When the user leaves the vehicle and undoes the mobile component, the function is interrupted. If subsequently, the authorized user puts the mobile component back in its intended place into the permanently fixed device component, whereby the respective mechanical contacts establish the electrical connection between the mobile component and the permanently fixed housing component, the function of the audio system is released. As a rule, release is after a check to verify whether the inserted mobile component is that of the authorized user. With known devices, for example, integrated circuits are used in the mobile component, which integrated circuits are supplied with the necessary operating voltage by way of connecting terminals, and whose input- and output connections are also connected to the permanently-fixed device component by way of these connecting terminals. Such a connection often causes contact problems which lead to faulty behavior, for example resulting in the function of the audio system not being released again, even for the authorized user.

An audio system of the type mentioned above is known from U.S. Pat. No. 5,349,326.

From this, an audio system is known in which its device component permanently fixed to the vehicle comprises a memory consisting of an EEPROM. The front panel, removably connected to it, comprises an operating field 9 as well as a memory 10 used to store a secret code. In addition, a read-out control device 11 for reading our the secret code from the memory 10 is required. Memory 10 also comprises and EEPROM, located in the permanently fixed device component, as is the memory.

In order to transmit the secret code from the mobile component to the permanently fixed device component, expensive electronics comprising the blocks 9, 10, and 11 are necessary.

SUMMARY OF THE INVENTION

By contrast, it is the object of the invention to further develop a device of the type mentioned above to the extent that on the one hand the electronic cost and complexity is reduces, and that on the other hand the assembly of the device is facilitated. According to the invention, this object is met by configuring the generic audio system according to the characteristics of the characterizing part.

The invention is characterized in that a special type of memory is used, namely a transponder, which inductively feeds into the control device, located in the permanently-fixed device component, the numeric code characteristic for this transponder. The transponder is characterized in that no further elements are required to read out the information from the mobile component because this happens directly by way of the coil of the transponder. On the other hand, the control unit now contains the demodulator receiving the transponder code which received the output signals of the transponder. By arranging the demodulator and the amplifier topped to it in a customer-specific control circuit (ASIC), installation of the device at the manufacturer is facilitated.

The invention is further characterized in that the use of a transponder obviates the necessity for electrical connection lines and thus for the conductive coupling between the mobile component and the permanently fixed device component. Upon activation of the transponder by way of respective control means in the control circuit, the transponder transmits it characteristic numeric code. By means of the comparator, this numeric code is verified against the security code previously stored in the control unit. If the result of the comparison shows agreement, then the audio equipment is released, or alternatively if there is no agreement, the bar is not removed. Due to the practically arbitrary security combinations which can be defined by the word length of the transponder code, security for audio systems in vehicles associated with a high risk of theft can be significantly improved.

In an alternative embodiment of the invention, the mobile component with the transponder can be part of the front panel of the audio system. In contrast to other solutions known from practical application, where the audio system has to be taken along in its entirety or in part when leaving the vehicle, here the component to be removed is a spatially narrowly device front panel section.

According to a preferred embodiment of the invention, the mobile component is a machine-readable card (credit card) in the ISO format. In this, the transponder is fixed on a carrier in the form of a usual credit card sot that is can be used as a personal identification instrument. This makes it possible that the user can use the user-specific transponder for different devices. In this, the credit card with the transponder can itself be the mobile component, without the need for a further component which is detachable from the installed device component.

Further preferred embodiments are provided in the following dependent claims. In particular, the transponder can be a wafer-programmed read-only transponder. It provides the advantage of being practically unique in respect of the transponder code because its particular code is programmed into it during manufacture. Due to the sheer number of possibilities represented by the digital numerical sequence, imitating this code is practically impossible.

BRIEF DESCRIPTION OF THE DRAWING

Below, the invention is explained in more detail by means of a sole FIGURE showing one possible embodiment of the present invention.

The sole FIGURE is a block diagram explaining the essential functions of the present invention.

DETAILED DESCRIPTION OF THE INVENTION

Figure 1:
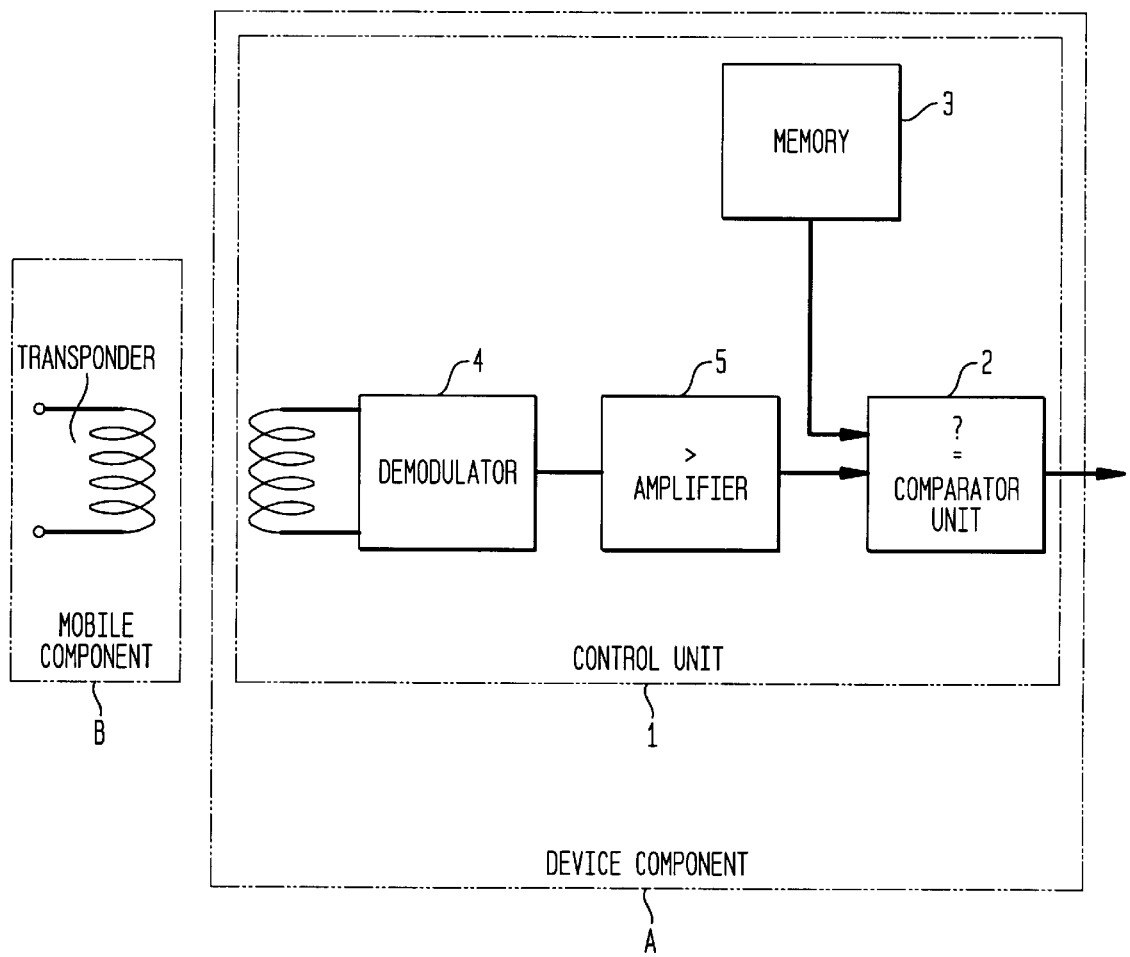

The letter A shows the device component permanently fixed to the vehicle. A control unit 1 which is described in more detail below is provided within the device component.

A mobile component B comprising a transponder T is connected in a removable way with the permanently fixed device component A. The permanently fixed device component A and the mobile component B can be coupled by way of mechanical means (not shown).

The control unit 1 comprises a demodulator 4 for receiving the digital numerical code transmitted by the transponder T. Topped to the demodulator 4 is an amplifier 5 and a comparator unit 2, the second input of which is connected to a memory 3 comprising a security code. The components, demodulator 4 and amplifier 5, are contained in a customer-specific circuit (ASIC) whereas the comparator 2 and the memory 3 are contained in a microprocessor or non-volatile memory.

The transponder T can be a wafer-programmed read-only transponder, a read-write transponder or a cryptological transponder.

The arrangement shown functions as follows:

If the mobile component B is removed from the provided mechanical mounting of the permanently fixed device component A, the function of the audio system is blocked.

If the user inserts the mobile component B comprising the transponder T into the mechanical receptacle in the permanently fixed device component A, the transponder T transmits its characteristic digital numerical sequence. This numerical code sequence is received and demodulated by the demodulator 4; it is subsequently amplified and compared in the comparator unit 2 with the typical security code applicable to the respective transponder T, which security code is contained in the memory 3.

If the two codes agree with each other, the audio system is released by means not shown; if it does not agree, it remains locked.

What is claimed is:

1. An audio system for a vehicle comprising:

a device component permanently fixed to the vehicle, the device component further comprising a control unit, and a mobile component connected to the device component in a mechanically detachable way, the mobile component further comprising a transponder for storing a numerical code, whereby the control unit further comprises a customer-specific control circuit (ASIC) which comprises a demodulator for receiving the numerical code from the transponder, and an amplifier, whereby function of the audio system is interrupted when the mobile component is removed from the device component and, after an authorization check, function of the audio system is restored when the mobile component is replaced in the device component, whereby the authorization check is performed by the control unit which further comprises a comparator unit for comparing the numerical code stored in the mobile component with a security code stored in a memory of the device component.

2. An audio system according to claim 1, wherein the mobile component forms part of a front panel of the audio system.

3. An audio system according to claim 1, wherein the mobile component is a machine-readable card in ISO format.

4. An audio system according to claim 1, wherein the transponder is a wafer-programmed read-only transponder.

5. An audio system according to claim 1, wherein the transponder is a cryptological transponder.

6. An audio system according to claim 1, wherein the transponder is a read-write transponder.

* * * * *